Dec. 3, 1963  U. D. COCHRAN ETAL  3,112,743
METHOD FOR TREATMENT OF BONE FRACTURES
Filed Sept. 1, 1960  3 Sheets-Sheet 1
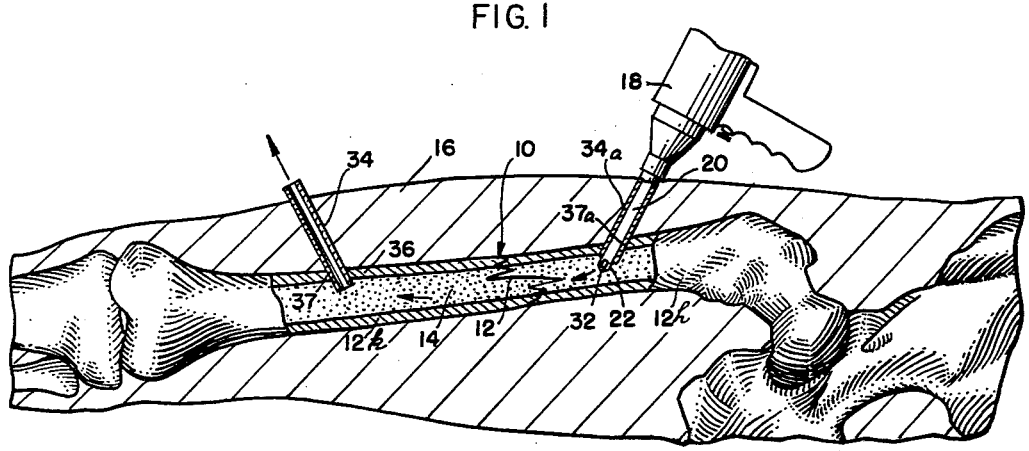
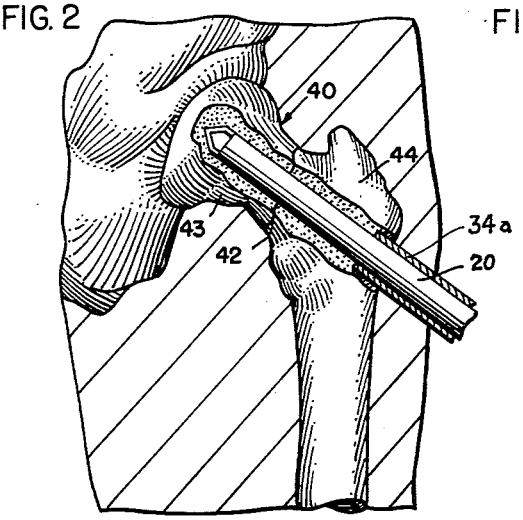
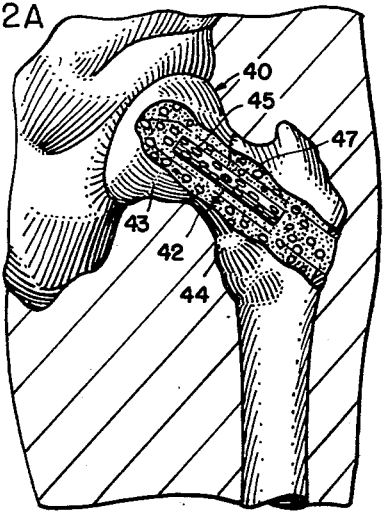
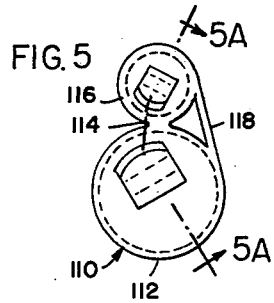
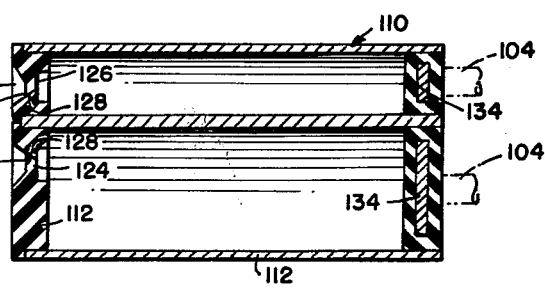
INVENTORS:
ULRICH D. COCHRAN
MICHAEL A. DiCOSOLA
BY
ATT'Y Dec. 3, 1963    U. D. COCHRAN ETAL    3,112,743
METHOD FOR TREATMENT OF BONE FRACTURES
Filed Sept. 1, 1960    3 Sheets-Sheet 2
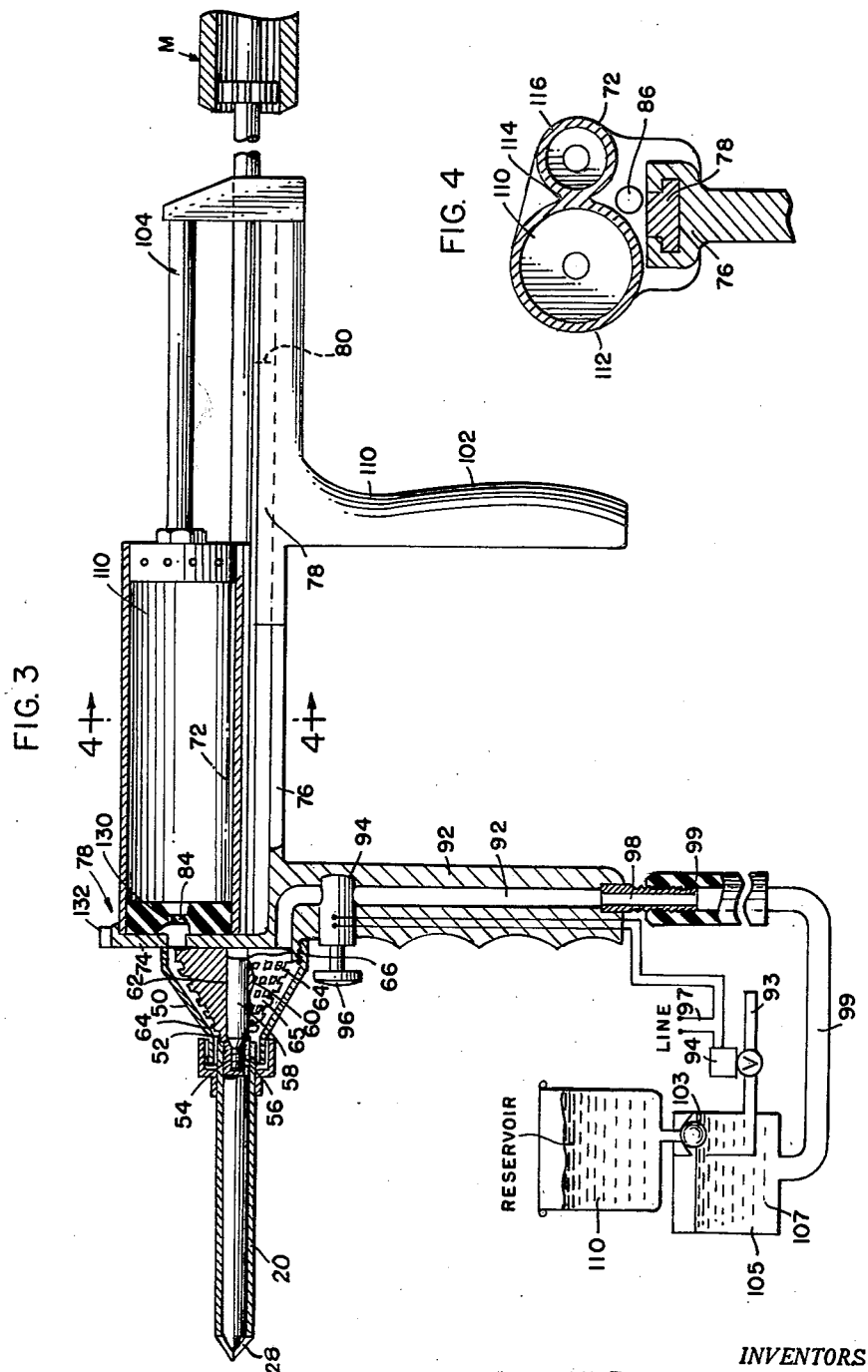
INVENTORS:
ULRICH D. COCHRAN
MICHAEL A. DiCOSOLA
BY
ATT'Y Dec. 3, 1963 U. D. COCHRAN ETAL 3,112,743
METHOD FOR TREATMENT OF BONE FRACTURES
Filed Sept. 1, 1960 3 Sheets-Sheet 3
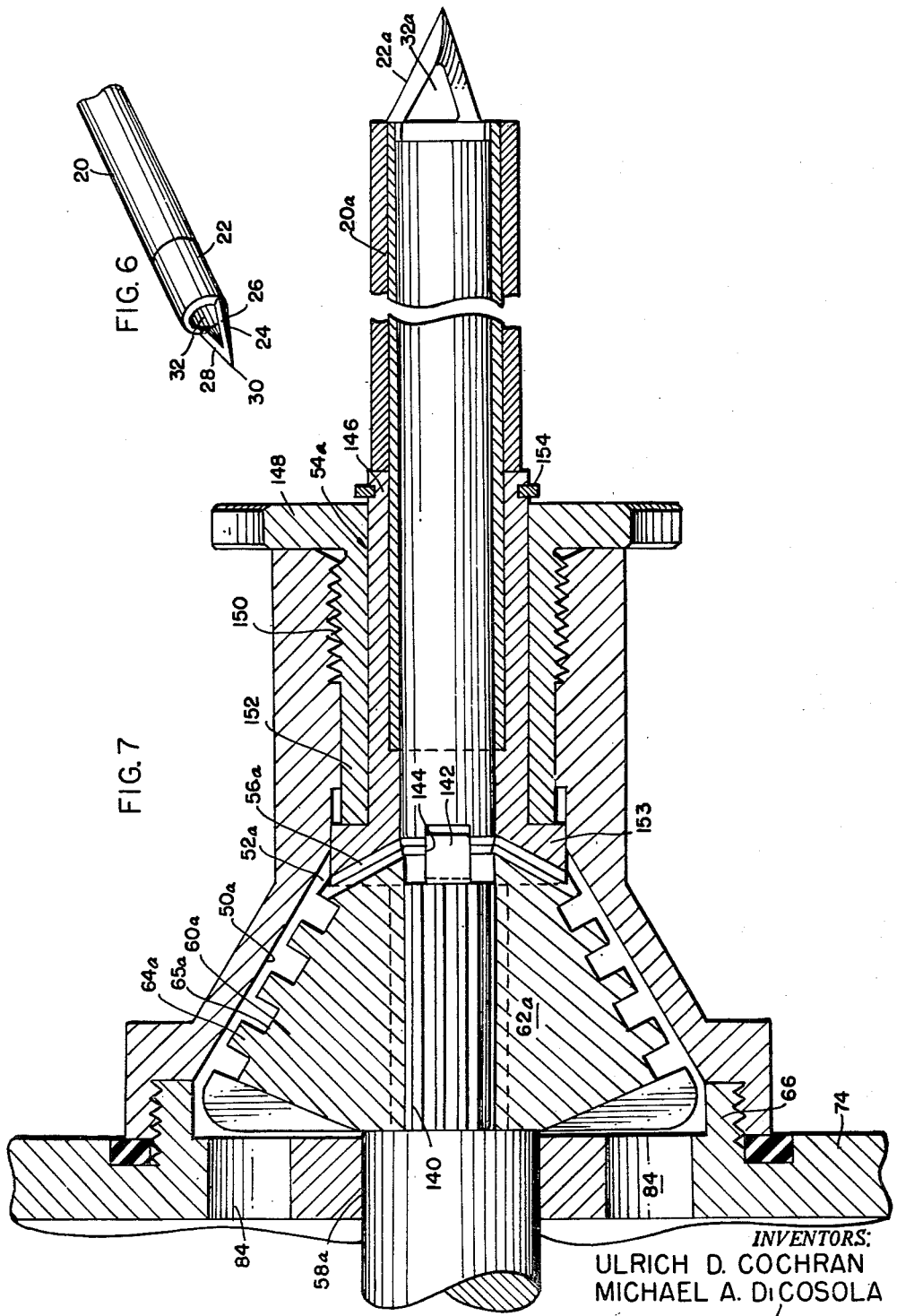
INVENTORS:
ULRICH D. COCHRAN
MICHAEL A. DiCOSOLA
BY
ATT'Y

United States Patent Office 3,112,743
Patented Dec. 3, 1963

3,112,743
METHOD FOR TREATMENT OF BONE FRACTURES
Ulrich D. Cochran, Coconut Grove, and Michael A. Di Cosola, Sarasota, Fla., assignors to Orthopaedic Specialties Corp., Sarasota, Fla., a corporation of Florida
Filed Sept. 1, 1960, Ser. No. 53,618
10 Claims. (Cl. 128—92)

The present invention relates to orthopaedics and particularly to a method and apparatus for the treatment of broken and fractured bones and contemplates the development of a lacunar-like system for the endochendral proliferation of new bone without the necessity of open reduction.

Polyurethane foam, having qualities of strength, adhesiveness and tensional stability that are required for stabilizing orthopaedic conditions has been used to treat long bone fractures as a plastic bone graft by open reduction in which the broken bone is exposed by incision, a lid spanning the fracture is cut and lifted out, the marrow removed, the madullary canal scraped, the polyurethane mixed and poured in place, the lid returned in place and the incision sutured and bandaged.

The polyurethane foam is a plastic belonging to the class of organic compounds called polymers and is preferably derived by mixing exact proportions of two viscous liquids, essentially four (4) parts by weight of a polyol bonded to an aromatic polyisocyanate and one part of a mixture of aliphatic tertiary amines and water in precise ratio as provided by the Wm. S. Merrell Company under the identification of Ostamer.

In the treatment of bone fractures by open reduction, all the dangers of open operative or surgical procedures are present including shock and infection which are generally aggravated by the patient's condition suffered when the injury occurred. Also, post operative care is substantial due to the extensive healing required. Other complications may also be present where non-union of bone sections has existed for some time and repeated open reduction procedures may be required. Moreover, the severance of the bone into further parts in the open reduction procedure where a lid is cut and removed, and also the scraping of the bone, involve post operative factors.

One additional and important problem involved with the open reduction use of a polyurethane plastic is the rapidity with which the surgeon must act once the bone is prepared because the polyurethane begins almost immediately to liberate $CO_2$ so that it foams and progresses rapidly into a plastic state which results in a rigid, porous foam. Heretofore, a mixing of the ingredients must be carefully completed in less than 10 seconds under open and sterile conditions. The mixture must be poured and the graft lid in place within the next twenty seconds for adequate and proper bonding, expansion and setting. The setting occurs in five minutes, and twenty minutes should be allowed before attempting to close the wound. Thus, the open reduction method is generally limited to long bones and a massive operation of major duration to lay bare and close the site of the fracture.

An object of the present invention is to provide an improved process and a novel device or tool for use in performing the process whereby fractured bone may be provided with an intermedullary splint without laying bare the bone and thereby eliminate the time, infection, shock and mechanical hazards experienced with the open reduction technique.

A further object of the invention is to provide a method for internally splintering a bone fracture in which preliminary preparation can be accomplished with care, preferably without open reduction but with or without open reduction, polyurethane is progressively mixed at as rapid a rate as desired with minimum power requirement and simultaneously injected into the bone as needed without laying the bone bare or cutting any muscle tissue in the process.

More particularly the process of the invention contemplates setting the bone fracture members in proper place by manipulation, passing a small drill between tendons in the areas beyond the muscle tissue itself, drilling a hole through the bone cortex on one side of the fracture and placing a tube therein and then repeating same by drilling a hole through the bone cortex on the opposite side of the fracture with a tubular drill bit and then with the drill preferably still running with the drill bit at the limit of its advance and with the bone immobilized, progressively mixing and injecting polyurethane into the medullary canal to force and remove the marrow out through the first tube until polyurethane begins to appear at the mouth of the first tube so that $CO_2$ expansion or foaming of the polyurethane which follows very quickly will, in its confinement, force the polyurethane into all interstices and into unscraped cavities and around internal ridges and into the medullary canal ends beyond the drilled openings before the polyurethane begins to set. Thereafter the tube and drill are removed to break off the sprue and permit the tendons to resume their positions. The bone is held immobile for ten minutes longer and thereafter the patient may move the bone to relieve any discomfort. The drill openings through the skin can be closed by a patch bandage and upon the elapse of forty-eight hours or less, normal use of the bone can be considered with no need to consider healing time of muscle tissue other than that which might be involved because of damage by the bone fragments themselves.

The invention is characterized by a full flow of polyurethane into place with no delay after mixing. Thus, within the brief time that it is fluid, the space available has been filled as desired, the release of $CO_2$ which is expected to follow almost immediately packs the bone under full pressure developed by the foam with the potential volume of the plastic foam being twice that of the liquid at atmospheric pressure. The pressure is a gas pressure and with what expansion will occur which would be at least one-half the volume of the liquid the pressure per square inch would be less than 15 p.s.i. gauge if all the $CO_2$ were to be liberated. Moreover, the $CO_2$ is miscible in the blood.

Post-operatively, the rigid polyurethane foam acts as a lacunar system for the endochondral proliferation of new bone in which the lucanae of the foam is thin enough to permit penetration of osseous tissue and is also gradually absorbed by the body within two years as it is progressively replaced by new bone and new marrow growth.

A further object of the invention is to provide an improved bone drill which mixes two ingredient progressively and ejects the mixture at the drill point under pressure, yet may be easily cleaned rapidly and used again immediately for further or different mixing operations in rapid succession.

The invention is also characterized by a capsule arrangement and construction wherein materials to be mixed are not exposed for mixing except in the right proportion and only then as progressively needed under the manual control of the operator.

The mixing-ejecting drill of the present invention progressively mixes viscous material as distinguished from batch mixing so that it may be powered by low power motors normally used and found in operating rooms of hospitals for orthopaedic work.

Another object of the invention is to mix sterile ingredients and inject same into a cavity without exposure to water or air in the process of transferring it from separate storable containers to a predetermined place in living cell structure.

It has also been found that polyurethane, while weakened by contamination with water, does not lose its strength when mixed and transferred directly into living cell structure and for that reason curetting and drying of bone structure is not required as in open reduction practice, and with the full flow of the polyurethane there is little likelihood of medullary ooze contaminating the working body of pure polyurethane.

With the present invention not only are long bones better treated but access may be had to inject polyurethane into porous portions of short bones, femoral necks to treat fractures similar to intertrochanteric or subtrochanteric fractures of a femur with the result that pinning effects can be accomplished by polyurethane foam elements deposited in situ by the hollow drill as it is withdrawn, or, the polyurethane foam deposited can be used as foundation for metal pins if bone structure is otherwise weak or somewhat shattered.

Furthermore, in the operative procedure of the present invention there is little danger of embollus of trapped air. The $CO_2$ is absorbed as it progressively is displaced in post operative recovery.

These being among the objects, advantages and characteristics of the invention other and further ones will become apparent from the claims, the description and the drawings relating thereto in which:

FIG. 1 is a side elevation of a portion of a person's leg or thigh showing a fracture of a long bone such as a femur being internally splinted by the method of the present invention;

FIGS. 2 and 2a are side elevations of a fractured femoral neck during and after being pinned by polyurethane foam plastic to fixate the parts for healing;

FIG. 3 is a side elevation of the combination drilling, mixing and cleaning apparatus or tool embodying our invention partly in longitudinal section showing the valved head of the ampule and the piston evacuator for the ampule in operative position;

FIG. 4 is a section taken on the line 4—4 of FIG. 3 showing the mixture proportioning cross sectional relationship of two side by side compartments made from a plastic extension;

FIG. 5 is a valve end view of the ampule shown in FIG. 4;

FIG. 5a is a longitudinal sectional view through the ampule compartments taken on line 5a—5a in FIG. 5;

FIG. 6 is a longitudinal section of the bit end of the hollow drill through which the mixture is ejected; and FIG. 7 is a longitudinal section of the preferred construction of the mixing chamber and clutch drive of the drill.

Referring now to FIG. 1, a femur 10 is shown having a break or fracture at 12 between the hip end section 12h and the knee end section 12k. The medullary canal in the bone is diagrammatically shown at 14 and extends across or through the fractured site. The flesh on the thigh around the femur is indicated at 16. The orthopaedic tool comprising a drilling and mixing gun 18, which will be described in further detail later in connection with FIG. 3, has a hollow tube drill 20 provided with an axially and radially ported bit 22 (FIGS. 6 and 7). In FIG. 6 the bit comprises a tapered tip 24 sharpened half away to leave right and left hand turn cutting edges 26 and 28 respectively, which define the port 32 behind a point 30. Another form of the ported bit is shown in FIG. 7 at 22a which comprises a tapered triple cutting edge spider 24a for right hand turn cutting. Other bone drills may be used but it will be noted that the one indicated in FIG. 6 cuts in either direction of rotation provided by the motor, it being appreciated however that regardless of direction, material may be forced through the tube and discharged radially and axially of the drill through an end opening such as 32a.

The drill 20 is of sufficient length to extend through the flesh and into the bone at an angle of as much as 45° so that it may be located and directed between muscles and muscle tendons adjacent to their ends to save damage to the muscle tissue and still reach the medullary canal in the bone when penetration of the bone cortex is completed.

After the fractured bone 10 has been manually set by the doctor, it is immobilized as by sand bags or even a partial cast (not shown), local anesthetic is applied. Thereupon, the drill 20 preferably receives a thin wall sleeve or tube 34 on it and is woven between tendons and muscle coverings until the point comes to rest upon the cortex 36 of bone 10. Thereupon, the drill is rotated inside the tube, to prevent damage to the flesh, until the bone cortex 36 is perforated as at 37 and the bit advances deep into the medullary canal 14 whereupon the drill is removed leaving the tube 34 in place to vent the medullary canal to atmosphere or a suction pump (not shown).

Another sleeve 34a like the first is preferably placed on the drill 20 and on the opposite side of the fracture 12, adjacent the other end 12h of the bone 10, the drill 20 and sleeve 34a are threaded between muscles and tendons to engage the bone cortex 36. The drill again is rotated to penetrate deeply into the other end of the medullary canal 14. The second sleeve need not be used but it is preferred to serve as a guide and depth gauge for the bit 22 in the operative steps that follow.

The chips (not shown) formed by the drill are small and intentionally comminuted by the drill used so as not to interfere with the flow of material into or out of the medullary canal.

The drill is then charged with a viscous polyurethane mixture under pressure (as later described) and this flows through the drill 20 and bit port 32 preferably while they rotate to spread the mixture in all directions in the immediate region of the medullary canal. The flow of the viscous mixture into the medullary canal displaces marrow and other fluid contents of the medullary canal ahead of it out through the tube 34 until polyurethane begins to appear whereupon the tubes 34 and 34a are withdrawn enough to clear the bone cortex and fill the openings 37 and 37a in the bone cortex with polyurethane and the drill is removed and cleaned. After the polyurethane has set the tubes 34 and 34a are manipulated to break the polyurethane that is disposed between them and the bone and then withdrawn to permit the tissues 16 and skin to close and heal. This leaves an intermedullary splint of polyurethane foam wholly within the contour of the bone which has expanded into all the irregularities of the medullary canal 14 to hold the bone parts 12k and 12h in fixed position with polyurethane foam forced into any interstices associated with the fracture 12.

In FIG. 2 is shown a novel way of pinning a femoral neck fractured at 42. After the two bone parts 43 and 44 are set and immobilized, the drill 20 is threaded between muscles and tendons and propelled through the two parts to the depth shown, preferably with a thin metal sleeve on it. The drill is then removed from the tube and cleared of bone debris and the drill then charged with polyurethane and returned to its working position whereupon pressure is applied to the polyurethane and more slowly than the polyurethane is discharged the drill and tube 34a are withdrawn so that the polyurethane expands into the lacunae of the bone structure. The tube 34a is withdrawn from the bone cortex and the opening filled and when clear of the bone the drill is removed and cleaned and the tube is left in place until the polyurethane is set. Thereupon the tube is manipulated to sever from the bone any polyurethane beyond the bone and such is removed with the final withdrawal of the tube.

In this instance supplemental elements may be employed as where after the drill is removed and while the polyurethane is still soft, a short metal pin or tube 45 (FIG. 2a) may be inserted into place through the tube to span the fracture site 42 and give added strength to the polyurethane splint indicated at 47. If the insert is a tube, and such is preferred, it preferably is foraminated through the walls thereof to permit the polyurethane to expand therein and therethrough to embed the tube completely in a thoroughly mutually strengthened relationship, the tube contributing greater strength and the polyurethane contributing firm securement in the bone structure.

Referring now more particularly to the orthopaedic apparatus or tool 18 shown in FIG. 3, it is to be appreciated that in orthopaedic surgery whatever splinting material is used, whether it be polyurethane or some other material, such has to be composition of exact proportions of a plurality of ingredients which must be enduring for long periods of time when stored separately, but when mixed will act quickly to form the desired end product. This leaves very little time for a surgeon to perform his tasks and much of this time is encroached upon by the batch mixing time generally required and the prolongation of time encountered to use the entire batch within its usable time. Maybe only seconds remain available. Electric power for mixing and available space are also at a premium under such conditions and most often special motors or auxiliary power are needed where rapid, clockwork activity is required. These factors make the operation ponderous.

In the present invention, the surgeon is greatly relieved of the pressure of time involved in handling fast acting ingredients. A conical mixing chamber 50 is provided having its outlet 52 at the apex where it journals the base 54 of the hollow drill 20 in sealed relation and discharges into the hollow drill 20 through a spider or openings 56 which detachably supports the drill in clutch relationship with a drive shaft 58, a mixing element 60, or both. The mixing element 60 is also received on a reduced portion 62 of the drive shaft 58 and has teeth 64 on its outer conical counter whose outer ends run with close clearance inside the mixing chamber 50.

With the ends of the teeth 64 running close to the wall of the mixing chamber 50 as shown, sufficient shear is present therebetween for the viscous liquids to be rapidly and thoroughly mixed in the shallow spaces 65 around the teeth, the shear drag continually turning the viscous liquid mixture in the spaces for rapid and intimate mixing purposes and the spaces further serving as flow passages for the advancement of the mixture from the major diameter of the cone to the minor diameter with an accelerating flow towards the discharge openings 56.

Feed openings into the mixing compartment are arranged peripherally around the base of the conical mixing chamber 50 as at 84 for direct access to the mixing area and the supply of materials used in the mixing chamber and also for cleaning the mixing chamber will now be described.

The tool 18 comprises the base 74 having a ring boss 66 cast integrally on the front face thereof to receive the mixing chamber member 50 in supported and concentric relationship with respect to the drive shaft 58. On the other side the base 74 is flat and provided with the apertures 84 therethrough within and adjacent to the ring boss 66 so that material passing through the apertures moves directly into the peripheral mixing area of the mixing chamber 50. Disposed normal to the base 74 is a half-shell cradle construction 72 open for full access from the upper side and provided on the lower side with reinforcing stock defining a T-shaped track 78 and a journal 86 for the shaft 58.

Adjacent to the base 74 and on the opposite side therefrom the track 78 has formed thereon a rigid handle 90 provided with a conduit 92 therethrough opening into the mixing chamber inside the ring boss 66. Flow of fluid through the conduit 92 may be controlled by compressed air at 93 by a solenoid valve 94 actuated by a switch trigger 96 from the 110 v. power line 97. The inlet end of the conduit has a nipple 98 to which a flexible tube 99 is fastened to a supply of cleaning fluid 107 to the mixing chamber whenever the valve 94 is opened to apply air pressure. The cleaning fluid 107 may be supplied from a reservoir 101 through a float valve 103 to a measuring container 105 of limited volume and when the air under pressure is applied, it forces the cleaning fluid to flush the mixing chamber 50 and hollow drill 20 and then purges same with the air whenever desired.

Slidably mounted upon the T-shaped rail 76 is a carriage 100 having a handle 102 cooperating with the handle 90 to advance the carriage when the two handles are squeezed towards each other. One or more push rods 104 are secured to the carriage 100 and are pointed and movable towards the base 74 when the handles 90 and 102 are squeezed.

The materials to be mixed are supplied to the mixing chamber from interchangeable ampules 110 received laterally in said cradle 72 with one end against the base 74 and the other end in the path to be followed by the push rods 104.

The body of the ampule 110 preferably is a plastic extrusion which is cut off to the exact length desired and comprises two (or more) cylindrical portions 112 disposed side by side, with their cross-sectional areas exactly proportioned to that proportion resolved for the ingredients which are to be mixed. The ampule 110 is shaped so that it will be received in the cradle 72 in one position only as where the cylinders are joined at their line of tangency 114 to provide a downwardly facing cavity 116, while their upper edges are joined non-symmetrically by a web 118 preferably tangent to both cylindrical walls. To assure the correct positioning of the ampule the cradle is correspondingly shaped to mate with the cavity 116 but interfere with the web 18.

The end 120 of the ampule adjacent to the base 74 received two soft elastomer plugs 122 recessed at 124 opposite the respective openings 84 to provide a thin wall structure 126 cut as at 128 to provide flapper valves 130 opening directly into the openings 84. The plugs 122 are of diameters corresponding to the diameters of the cylinders and overlap the ends thereof to rest against the base 74 to establish a seal therebetween when they are compressed under internal pressure and external back pressure. A marginal flange 132 around the edge of the base 74 holds the ampule in proper place against inadvertent dislodgement.

The other ends of the cylinders receive reinforced piston closures 134 which are engaged by the rods 104 and advanced by the carriage 100 to discharge the contents of the cylinders to the mixing chamber through valves 130 in exactly proportioned quantities progressively. Preferably the walls of the ampules are transparent to ascertain the amount of liquid therein but need not be so because indicia may be placed on the track and slide to indicate the amount of ingredients remaining.

The ampules are charged with the ingredients under sterile conditions by a needle (not shown) through the rubber wall 122 with the air venting through the flapper valves 130 until completely filled. They are packed in sterile containers. Preferably the larger cylinder holds 61 gm. of polyol bonded to an aromatic polyisocyanate and the small cylinder is charged with a catalyst of 15 gm. of a mixture of aliphatic tertiary amines and water in precise ratio.

Once the bone 10 is drilled as shown and described in connection with FIG. 1, the ampule 110 is disposed in place in the cradle 72 and the handles 90 and 102 squeezed with the shaft 58 rotating until sufficient ingredients from both cylinders flow into the mixing chamber, are mixed, and flow out to fill the drill 20 up to the opening 32 in the bit 22. This clears the drill 20 of debris. Thereupon the drill is reinserted in the tube 34a and further ingredients are squeezed out, mixed and injected into the medullary canal 14 with other capsules used if more polyurethane is needed. When polyurethane appears at the other tube 34 as already described, the squeezing pressure is stopped as the drill is being withdrawn from the tube and when clear of the tube the trigger switch 96 is depressed and the cleaning fluid is forced into the mixing chamber under pressure closing the float valve 103 and also the rubber flapper valves 130 to prevent contamination of the ampule contents. With the mixer element 60 running, it is flushed free and then purged by air. Thereafter, the tool can be laid down and the ampule later started again by squeezing the handle if use and injection is resumed.

The cleaning fluid is Freon in which both ingredients are miscible, and to avoid waste, a measured quantity is used for each cleaning and replenishing after each use. Other suitable solvents could be used but Freon is preferred.

It is of interest to note that this method and apparatus in the brief seconds that are available to the doctors utilizes the exothermic heat of reaction which reduces the viscosity momentarily following the mixing to permit rapid flow while the mixture is being injected, thereby enabling the use of the low horsepower surgical motors found in operating rooms.

A modification of the drive mechanism is shown in FIG. 7 where rotation of the drill 20a may be stopped when it is desired to have it serve as a material conducting tube without rotation. At its front end, the shaft is splined at 140 to drive the mixing element continuously but cross-tongued at 142 at the end to engage a groove 144 on the drill when advanced towards each other to engage each other. The butt of the drill 20a is mounted in a shouldered sleeve 146 that is journalled in a gland nut 148 threaded as at 150 on the housing of the mixing chamber for rotational movement that results in reciprocation of its inner end 152 against the flange 153. A C-spring 154 axially locates the shank of the drill with respect to the gland nut 148 against separation whereby by manipulation of the gland nut reciprocating the drive shaft the drive clutch of the cross-tongue and groove can be engaged and dis-engaged.

Having thus described the invention it will be readily apparent how the stated and other objects are attained and how various and further changes can be made without departing from the spirit of the invention, the scope of which is commensurate with the appended claims.

What is claimed is:

1. The process of stabilizing a fractured long bone comprising setting and immobilizing the bone, aperturing the cortex of the bone for access to the medullary cavity of the bone at points on opposite sides of the fracture site and spaced therefrom, progressively mixing a viscous rapidly setting plastic and injecting it into the medullary cavity through the aperture at one point to force the contents of the medullary cavity out through the aperture at the other point past said fracture site and replace same with said plastic.

2. The process of stabilizing a fractured long bone comprising setting and immobilizing the bone, aperturing the cortex of the bone into the medullary canal of the bone on opposite sides of the fracture, progressively mixing a viscous rapidly setting plastic and injecting it into the medullary canal through one aperture to flow the plastic lengthwise in the medullary canal past the fracture site and force the fluid contents of the medullary canal out through the other aperture and replace same with said plastic, closing said apertures with plastic, and permitting the plastic to harden.

3. The process of internally splinting a fractured long bone comprising setting and immobilizing the bone in part with the living flesh normally surrounding the bone at the site of the fracture, penetrating the flesh surrounding the bone adjacent to the ends of the bone and opening the medullary canal of the bone through the bone cortex on opposite sides of the fracture at points spaced therefrom, injecting a viscous rapidly setting plastic into the medullary canal through one of the openings to force the fluid contents of the medullary canal therefrom out through the other opening and replace same with plastic flowing past said fracture between said openings, closing said openings with plastic, and permitting the plastic to set before movement of the bone.

4. The process of internally splinting a fractured bone comprising setting and immobilizing the bone in part with the living flesh normally surrounding the bone at the site of the fracture, penetrating the flesh surrounding the bone adjacent to the ends thereof and exposing the medullary canal of the bone through openings in the bone cortex on opposite sides of the fracture at points spaced therefrom, progressively mixing and simultaneously injecting polyurethane into the medullary canal through one of the openings while the heat of chemical reaction is developing to force the fluid contents of the medullary canal therefrom out through the other opening and replace same with polyurethane flowing past said fracture site between said openings, closing said openings with polyurethane, expanding the polyurethane present in the medullary canal into the interstices of the fracture and to form a lacunar-like system for the endochondral proliferation of new bone and permitting the plastic to set before movement of the bone.

5. The process of internally splinting a fractured elongated living bone portion comprising setting the bone without further severence of the bone, aperturing the cortex to the interior of the bone portion at a point spaced from the fracture site through a circular opening in the bone cortex, progressively mixing and simultaneously injecting under pressure through said opening a viscous rapidly setting plastic into contact with bone portions unexposed to air, liberating carbon dioxide throughout said plastic to expand said plastic and fill the lacunae of the bone structure and the interstices of the fracture and said opening, and absorbing said carbon dioxide in the blood.

6. The process of internally splinting a fractured elongated portion of living bone in situ comprising aperturing the cortex to the interior of the bone portion longitudinally thereof and drilling a hole within the bone cortex and past the fracture site through an opening in the bone cortex at a point spaced from the fracture site without open reduction exposing the fracture area of the bone and without curetting immediately mixing and injecting polyurethane through said opening under pressure into said interior of the bone portion beginning at the bottom of the hole and embedding within the bone contour a reinforcing element in the polyurethane and across the fracture, expanding the polyurethane present in said interior with liberation of carbon dioxide under pressure in said polyurethane to fill lacunae of the bone structure and space around the reinforcing element and the interstices of the fracture and said opening to form a lacunar-like system for the endochondral proliferation of new bone, holding the bone portion in place by surrounding flesh in situ against the expansion pressure of the polyurethane, and absorbing said carbon dioxide in the blood.

7. The process of internally splinting a fractured elongated portion of living bone in situ comprising setting the bone parts and immobilizing the bone in part with living flesh normally surrounding the site of the fracture without open reduction, penetrating the flesh and cortex of the bone with a hollow drill at a point spaced from the fracture and drilling an opening and a cylindrical cavity into the interior of the bone portion in a direction longitudinally thereof with the drilled cylindrical cavity extending past and beyond the fracture site, mixing and injecting through said hollow drill while it is rotating a viscous rapidly setting plastic into the interior of the bone portion beginning at the bottom of the cavity to fill the bone lacunae and the interstices of the fracture and said opening, embedding a foraminous sleeve in said drilled cylindrical cavity within the outer contour of the bone and expanding said plastic with liberation of gas throughout said plastic under pressure to form a splint having a lacunar-like system in the interior of the bone portion around and in said foraminous sleeve of said plastic.

8. The process of internally splinting a fractured bone wholly within the external contour of the bone comprising setting and immobilizing the bone, aperturing the cortex of the bone at a point spaced from the site of the fracture and drilling out a portion of the interior of the bone past and beyond the fracture for internal access to the center of the bone and the area of the fracture and without curetting progressively mixing a viscous rapidly setting plastic and immediately injecting it with a spreading rotating action inside of the bone into the center of the bone through the aperture at said one point to fill the drilled-out portion, inserting a reinforcing member into said plastic within the confines of the bone across the fracture and essentially out of contact with bone tissue, expanding said plastic with liberation of gas throughout said plastic under pressure to fill bone lacunae and to form a splint having a lacunar system and embed said reinforcing member therein as the sole means for splinting the bone.

9. The process of internally splinting a fractured bone wholly within the external contour of the bone comprising setting and immobilizing the bone, drilling and aperturing the cortex of the bone at a point spaced from the fracture for access to the interior of the bone with a hollow drill without open reduction exposing the bone, progressively mixing a viscous rapidly setting plastic and simultaneously injecting it into the interior of the bone through the drill while rotating said drill to flow the plastic past the fracture site and against bone lacunae without exposure to air, liberating gas throughout said plastic to expand said plastic over the fracture site area and into the bone lacunae to provide with the bone lacunae a lacuna-like splint in the interior of the bone portion, closing said aperture with plastic within the contour of the bone, and permitting the plastic to harden.

10. The process of internally splinting a fractured bone having a medullary cavity comprising setting and immobilizing the bone, aperturing the cortex of the bone for access to the medullary cavity of the bone at one side of the fracture site and spaced therefrom without exposing the inside of the bone to air, progressively mixing a viscous rapidly setting plastic and simultaneously injecting it into the medullary cavity through the aperture to progressively replace fluid in the medullary cavity at the site of the fracture with said plastic, and liberating gas throughout said plastic to expand it to occupy under pressure more space in the medullary cavity including lacunae of the bone structure than that occupied by said displaced contents.

References Cited in the file of this patent

UNITED STATES PATENTS

| | | |
|---|---|---|
| 2,112,160 | Johnson | Mar. 22, 1938 |
| 2,503,341 | Kissileff | Apr. 11, 1950 |
| 2,537,070 | Longfellow | Jan. 9, 1951 |
| 2,577,279 | Simon | Dec. 4, 1951 |
| 2,579,968 | Rush | Dec. 25, 1951 |
| 2,947,307 | Hoppe | Aug. 2, 1960 |
| 3,030,951 | Mandarino | Apr. 24, 1962 |

FOREIGN PATENTS

| | | |
|---|---|---|
| 1,199,948 | France | June 22, 1959 |

OTHER REFERENCES

Block: "Bonding of Fractures by Plastic Adhesives," Journal of Bone and Joint Surgery, volume 40B, No. 4, November 1958, pages 804–810 relied on (copy in Division 55).

"Polyurethane Polymer—Its Use in Fractured and Diseased Bones"—American Journal of Surgery, volume 97, April 1959, pages 442–448 relied upon (copy in Division 55).